US009719346B2

United States Patent
Cao et al.

(10) Patent No.: US 9,719,346 B2
(45) Date of Patent: Aug. 1, 2017

(54) COMMUNICATING ACOUSTICALLY

(71) Applicant: Halliburton Energy Services, Inc., Houston, TX (US)

(72) Inventors: Qi Cao, Singapore (SG); Alberto Quintero, Singapore (SG); Jing Jin, Singapore (SG)

(73) Assignee: Halliburton Energy Services, inc., Houston, TX (US)

( * ) Notice: Subject to any disclaimer, the term of this patent is extended or adjusted under 35 U.S.C. 154(b) by 0 days.

(21) Appl. No.: 14/652,322

(22) PCT Filed: Jul. 15, 2013

(86) PCT No.: PCT/US2013/050461
§ 371 (c)(1),
(2) Date: Jun. 15, 2015

(87) PCT Pub. No.: WO2015/009272
PCT Pub. Date: Jan. 22, 2015

(65) Prior Publication Data
US 2016/0208604 A1    Jul. 21, 2016

(51) Int. Cl.
*E21B 47/00* (2012.01)
*E21B 47/16* (2006.01)
(Continued)

(52) U.S. Cl.
CPC .............. *E21B 47/16* (2013.01); *E21B 47/14* (2013.01); *G01V 1/22* (2013.01); *G01V 1/40* (2013.01); *G01V 3/34* (2013.01)

(58) Field of Classification Search
CPC ........... E21B 47/16; E21B 47/14; G01V 1/22; G01V 1/40; G01V 3/34
(Continued)

(56) References Cited

U.S. PATENT DOCUMENTS 5,050,132 A    9/1991 Duckworth
5,128,901 A    7/1992 Drumheller
(Continued)

FOREIGN PATENT DOCUMENTS

EP    0917893 A1    5/1999
EP    0917893 B1    2/2002
(Continued)

OTHER PUBLICATIONS

International Searching Authority, International Search Report and Written Opinion, International Application No. PCTUS2013/050461, which is a PCT parent to the instant application, Oct. 4, 2013.
(Continued)

*Primary Examiner* — Qutbuddin Ghulamali
(74) *Attorney, Agent, or Firm* — Howard L. Speight, PLLC

(57) ABSTRACT

An apparatus includes a housing. The housing includes a concentrator and a plurality of signal acquisition devices. Each signal acquisition device is coupled to a respective sensor. Each sensor measures an environmental parameter outside the housing. Each signal acquisition device includes an acoustic transducer. Each signal acquisition device includes a controller to accept measurements from the respective sensor, process the measurements and format them into a transmittable form, and transmit the formatted measurements via the acoustic transducer. A concentrator includes an acoustic transducer to receive acoustic transmissions from the plurality of signal acquisition devices, a processor to process the received acoustic transmissions, and a telemetry device through which the processor can transmit the processed transmissions.

20 Claims, 7 Drawing Sheets

(51) Int. Cl.
*E21B 47/14* (2006.01)
*G01V 1/22* (2006.01)
*G01V 1/40* (2006.01)
*G01V 3/34* (2006.01)

(58) Field of Classification Search
USPC .......................................... 340/854.4, 855.6
See application file for complete search history.

(56) References Cited

U.S. PATENT DOCUMENTS

| | | |
|---|---|---|
| 5,293,937 A | 3/1994 | Schultz et al. |
| 5,477,505 A | 12/1995 | Drumheller |
| 5,924,499 A * | 7/1999 | Birchak .................. E21B 47/14 175/40 |
| 6,434,084 B1 | 8/2002 | Schultz |
| 6,442,105 B1 | 8/2002 | Tubel et al. |
| 6,583,729 B1 | 6/2003 | Gardner et al. |
| 6,909,667 B2 | 6/2005 | Shah et al. |
| 6,933,856 B2 | 8/2005 | Schultz |
| 6,940,420 B2 | 9/2005 | Jenkins |
| 7,508,734 B2 | 3/2009 | Fink et al. |
| 7,781,939 B2 | 8/2010 | Fripp et al. |
| 7,911,879 B2 | 3/2011 | Jogi et al. |
| 2003/0072217 A1* | 4/2003 | Macpherson ........... E21B 47/16 367/82 |
| 2011/0018735 A1 | 1/2011 | Garcia-Osuna et al. |
| 2011/0205847 A1* | 8/2011 | Lemenager ............. E21B 47/16 367/82 |
| 2013/0038464 A1* | 2/2013 | Alteirac .................. E21B 43/16 340/854.4 |

FOREIGN PATENT DOCUMENTS

| | | |
|---|---|---|
| WO | 2011047389 A1 | 4/2011 |
| WO | 2011080640 A2 | 7/2011 |

OTHER PUBLICATIONS

Australian Government IP Australia, Patent Examination Report No. 1, Patent Application No. 2013394366, which is an AU counterpart to the instant application, Mar. 23, 2016.

European Patent Office, Extended European Search Report, Application No./Patent No. 13889593.3-1605 / 2989292 PCT/US2013050461, entire document, which is an EP counterpart to the instant application, Nov. 14, 2016.

* cited by examiner

COMMUNICATING ACOUSTICALLY

BACKGROUND

Some downhole tools or sondes used in oil field exploration, drilling, and/or servicing include multiple sensors that communicate their measurements to a small number of processors. The processor or processors gather the measurements and transmit them to surface equipment, often after processing them downhole. Reducing the wiring, and thus the complexity, of such a downhole tool is a challenge.

DETAILED DESCRIPTION

The techniques and equipment described herein will be described in the context of a wireline well logging system (see FIG. 1) and a drilling system (see FIG. 2). It will be understood that the techniques have application outside those fields.

Figure 1:
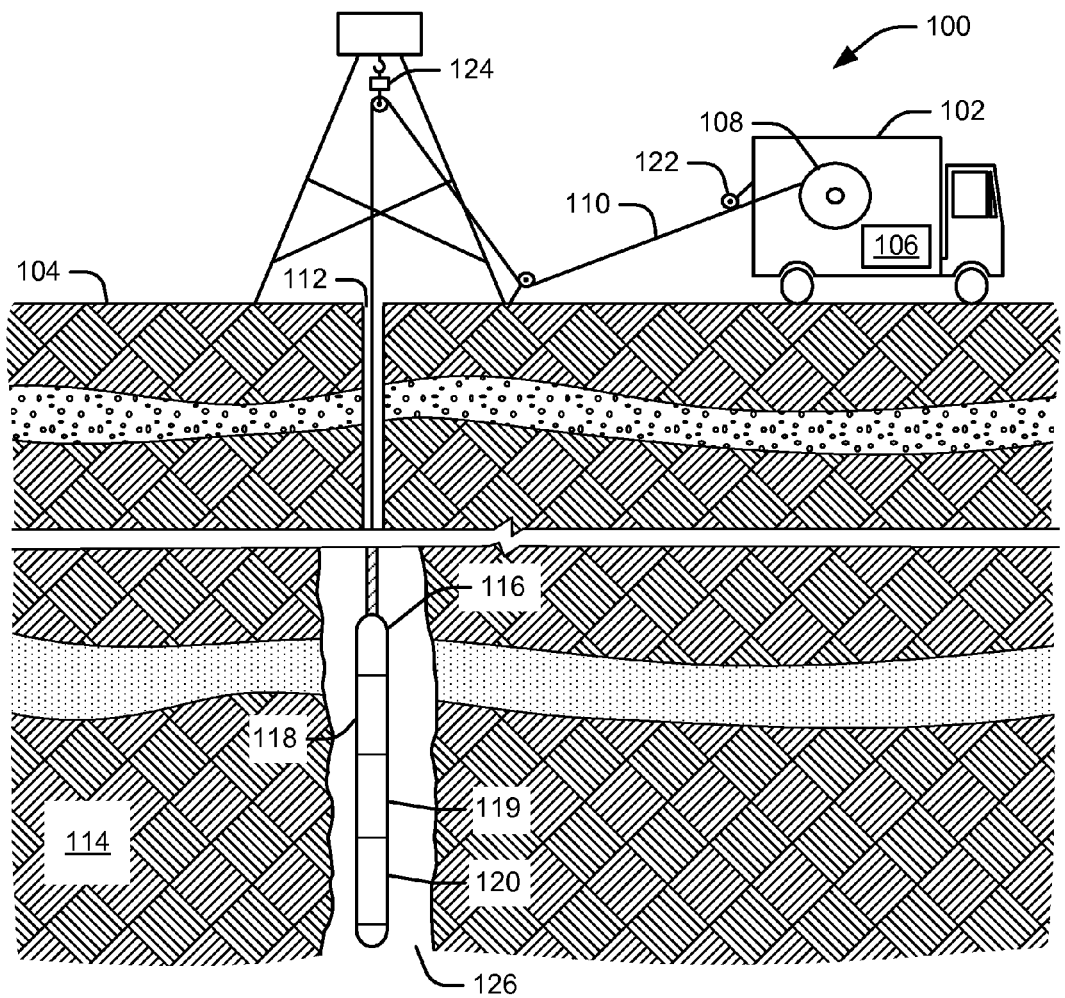
FIG. 1 shows a wireline well logging system.

In one embodiment of a wireline well logging system 100 at a well site, as depicted in FIG. 1, a logging truck or skid 102 on the earth's surface 104 houses a data gathering computer 106 and a winch 108 from which a logging cable 110 extends into a well bore 112 drilled into a formation 114.

In one embodiment, the logging cable 110 suspends a logging toolstring 116 within the well bore 112 to measure formation data as the logging toolstring 116 is raised or lowered by the logging cable 110. In one embodiment, the logging toolstring 116 is conveyed into the well bore 112 by coiled tubing (not shown). In one embodiment, in which the well bore 112 is a deviated well, the logging toolstring 116 is conveyed into the well bore 112 by a tractor (not shown). In one embodiment, the logging toolstring 116 includes a variety of "tools" or "sondes," such as tool or sonde 118, tool or sonde 119, and tool or sonde 120.

In one embodiment, as the logging tool 116 is raised or lowered within the well bore 112, a depth encoder 122 provides a measured depth of the extended cable 110. In one embodiment, a tension load cell 124 measures tension in the logging cable 110 at the surface 104. In one embodiment, the volume within the well bore 112 around the logging toolstring 116 is called the annulus 126.

Figure 2:
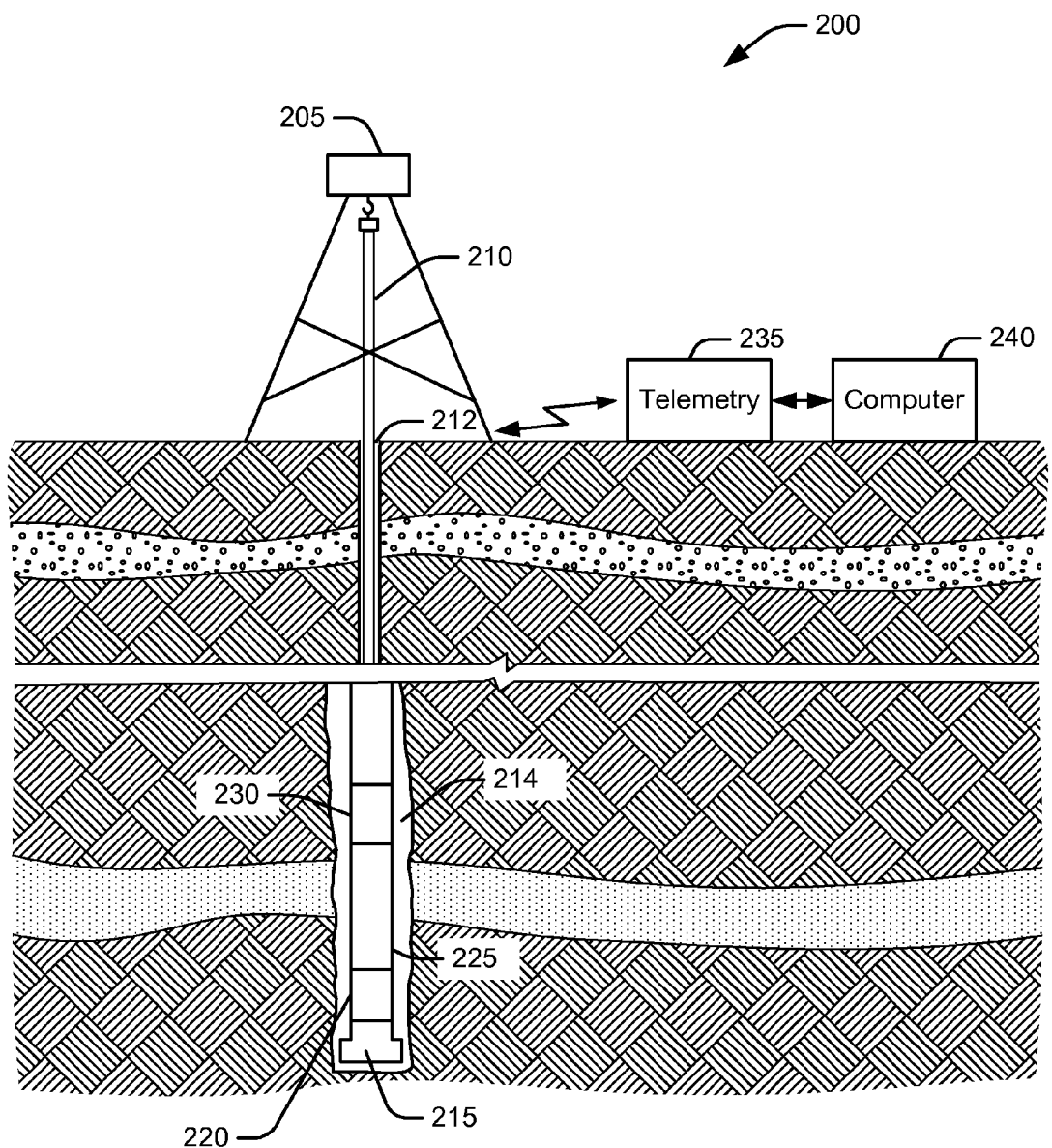
FIG. 2 shows a drilling system.

One embodiment of a drilling system 200, illustrated in FIG. 2, includes a derrick 205 from which a drill string 210 is suspended in a well bore 212. FIG. 2 is greatly simplified and for clarity does not show many of the elements that are used in the drilling process. Further, while FIG. 2 shows a land-based drilling system, the techniques and equipment described herein are also useful in a sea-based drilling system. In one embodiment, the volume within the well bore 212 around the drill string 210 is called the annulus 214. In one embodiment, the drill string includes a bit 215, a variety of tools or sondes, shown schematically by elements 220 and 225, and a telemetry section 230, through which the downhole equipment communicates with a surface telemetry system 235.

In one embodiment, a computer 240 receives data from the downhole equipment and sends commands to the downhole equipment through the surface telemetry system 235. In one embodiment the computer 240 includes input/output devices, memory, storage, and network communication equipment, including equipment necessary to connect to the Internet.

Hereinafter, a description will be provided of an acoustic communication system within the tool or sonde 120. It will be referred to as "sonde 120" but it will be understood that reference also includes "tool 120." It will also be understood that the description of the acoustic communication system in sonde 120 may also apply to the communication systems in the drilling system 200 tools or sondes 220 and 225 and the wireline logging system 100 tools or sondes 118 and 119.

Figure 3:
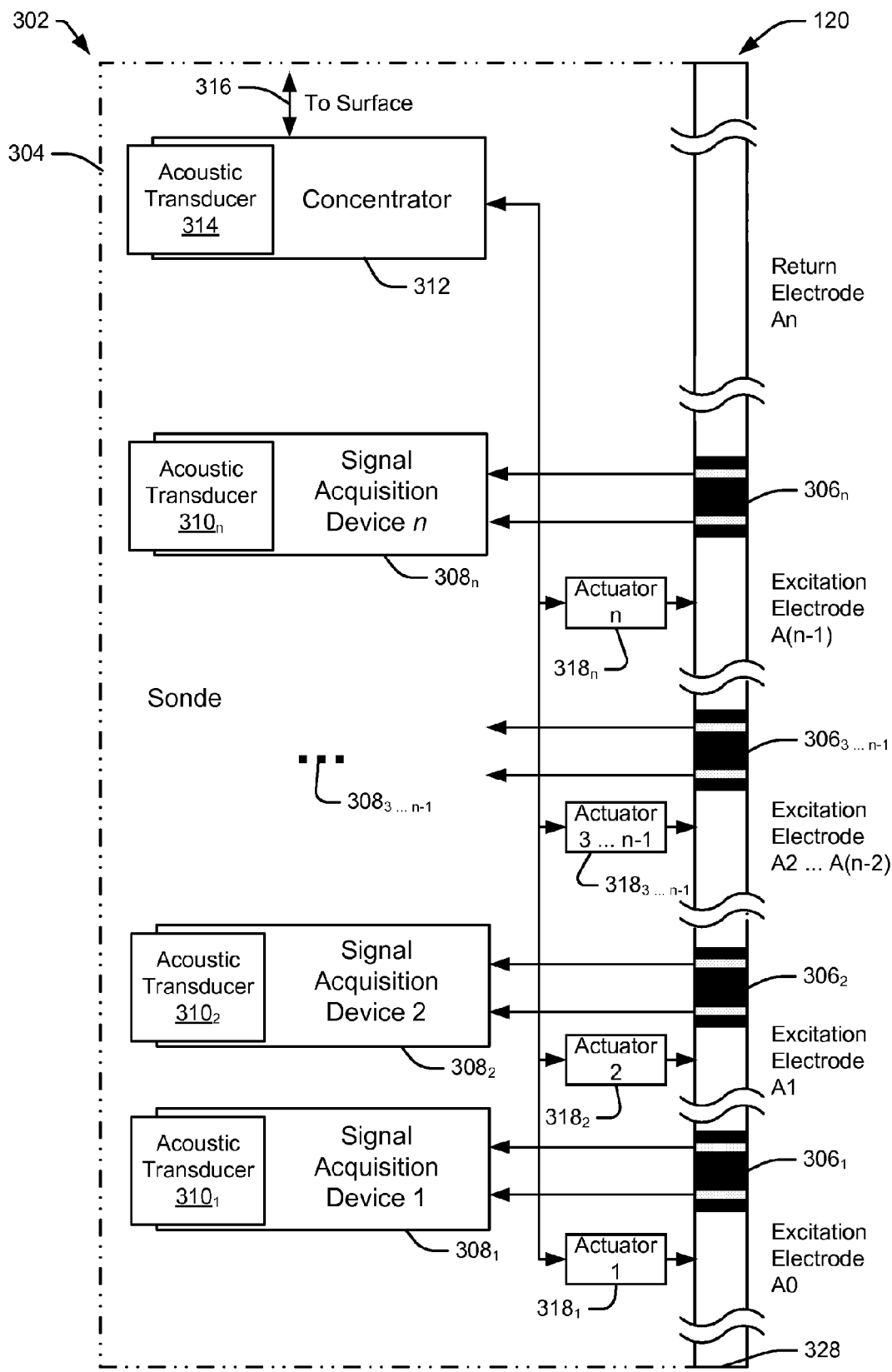
FIG. 3 shows an acoustic communication system operating within a housing.

In one embodiment of an acoustic communication system 302 within sonde 120, illustrated in FIG. 3, the acoustic communication system 302 is contained within a housing 304 within the sonde 120. In one embodiment, the acoustic communication system 302 includes a fluid outside the sonde 120. In one embodiment, the housing 304 is hollow and includes a chamber (not shown) which contains the acoustic communications system 302 and acoustic signals travel among elements of the acoustic communication system 302 through acoustic paths in the air or other fluid that fills the chamber. In one embodiment, the housing 304 is a solid (i.e., not hollow) metal, ceramic, plastic (or other similar) material, the elements of the acoustic communication system 302 are placed in receptacles within the housing 304, and acoustic signals travel among elements of the acoustic communication system 302 primarily through the material of the housing 304. In one embodiment the housing 304 is solid and acoustic paths include holes bored through the housing 304. In one embodiment, the acoustic signals travel through fluid outside the sonde 120.

In one embodiment, in which the sonde 120 is a wireline laterolog logging downhole tool, sensors (i.e., monitoring electrodes) $306_{1...n}$ are arranged along the periphery of the housing 304 and are situated to measure an environmental parameter, i.e., electrical voltage, outside the housing 304. In other embodiments, the sensors (i.e., monitoring electrodes) $306_{1...n}$ measure other environmental parameters, such as acoustic pressure, temperature, pressure, stress, strain, etc. In one embodiment, excitation electrodes A0 ... A(n−1), which are also arranged along the periphery of the housing 304, are used to excite the environment outside the sonde 120 creating the environmental parameter that is measured by the sensors (i.e., monitoring electrodes) $306_{1...n}$. In the case of the illustrated wireline laterolog logging downhole tool, in one embodiment, the excitation electrodes A0 ... A(n−1), and a set of excitation electrodes A'1 ... A'(n−1) (not shown) that mirror excitation electrodes A1 ... A(n−1) below excitation electrode A0, generate electrical currents that flow laterally away from the tool 120 and return to the return electrode An and A'n (not shown) that mirrors An below excitation electrode A'(n−1) (not shown). In one embodiment, in the illustrated wireline laterolog logging downhole tool, the sensors (i.e., monitoring electrodes) $306_{1...n}$ measure voltages at the junction of the excitation electrodes A0 ... A(n−1) (similar sensors (i.e., monitoring electrodes) (not shown), hereinafter included in reference $306_{1...n}$, make the same measurements for excitation electrodes A'1 ... A'(n−1)(not shown)) as part of a control loop that includes a concentrator 312 (discussed below) and actuators $318_{1...n}$, (discussed below) in order to focus the flow of current from excitation electrodes A0 ... A(n−1) (similar actuators (not shown), hereinafter included in reference $318_{1...n}$, perform the same function (discussed below) for excitation electrodes A'1 ... A'(n−1)). With the measured electric voltages from sensors (i.e., monitoring electrodes) $306_{1...n}$ and known parameters of excitation currents from excitation electrodes A0 ... A(n−1), and the mirroring sensors (not shown) and excitation electrodes A'1 ... A'(n−1) (not shown), the sonde 120 can compute the resistivity of the formation 114 accordingly. In one embodiment, the distances from the bottom 328 of the housing 304 to all of the elements of the communication system 302 is known and is used by one of the crosstalk elimination techniques described below.

In one embodiment, sensor (i.e., monitoring electrode) $306_1$ is located between excitation electrode A0 and excitation electrode A1. In one embodiment, sensor (i.e., monitoring electrode) $306_2$ is located between excitation electrode A1 and excitation electrode A2 (shown in FIG. 3 as part of excitation electrode A2 ... A(n−2)). In one embodiment, sensor (i.e., monitoring electrode) $306_3$ (shown in FIG. 3 as part of sensor group $306_{3\ through\ n-1}$) is located between excitation electrode A2 (shown in FIG. 3 as part of excitation electrode A2 ... A(n−2)) and excitation electrode A3 (shown in FIG. 3 as part of excitation electrode A2 ... A(n−2)). In one embodiment, sensor (i.e., monitoring electrode) $306_n$ is located between excitation electrode A(n−1) and the return electrode An.

In one embodiment, signal acquisition devices $308_{1...n}$ are coupled to respective sensors (i.e., monitoring electrodes) $306_{1...n}$ (similar signal acquisition devices (not shown), hereinafter included in reference $308_{1...n}$, are coupled to the sensors (i.e., monitoring electrodes) (not shown) that make measurements for excitation electrodes A'1 ... A'(n−1)(not shown)). In one embodiment, signal acquisition device 1 $308_1$ is coupled to sensor (i.e., monitoring electrode) $306_1$. In one embodiment, signal acquisition device 2 $308_2$ is coupled to sensor (i.e., monitoring electrode) $306_2$. In one embodiment, signal acquisition devices 3 ... (n−1) $308_{3...(n-1)}$ (represented by the ellipsis) are coupled to sensors (i.e., monitoring electrodes) $306_{3...(n-1)}$. In one embodiment, signal acquisition device n $308_n$ is coupled to sensor (i.e., monitoring electrode) $306_n$. In one embodiment, the coupling between a signal acquisition device and its respective sensor is shown as two vectors, indicating that the sensor has two outputs (such as monitoring electrodes as in the case of a laterolog logging downhole tool). It will be understood that this is not a limitation and that there can be any number of connections between the signal acquisition devices $308_{1...n}$ and their respective sensors (i.e., monitoring electrodes) $306_{1...n}$.

In one embodiment, the signal acquisition devices $308_{1...n}$ are printed circuit boards ("PCBs"). In one embodiment, the signal acquisition devices $308_{1...n}$ are other forms of electronics, such as prototype boards or devices that contain PCBs.

In one embodiment, in order to reduce noise and to acquire more accurate sensor physics signals from the sensors (i.e., monitoring electrodes) $306_{1...n}$, the signal acquisition devices $308_{1...n}$ are placed as close to their respective sensors (i.e., monitoring electrodes) $306_{1...n}$ as possible (i.e., within 100 millimeters ("mm")). In one embodiment, in a sonde 120 with multiple sensors (i.e., monitoring electrodes) $306_{1...n}$ such as that shown in FIG. 3, multiple signal acquisition devices $308_{1...n}$ are positioned and shielded inside the housing 304. In one embodiment, the distances between each pair of signal acquisition devices $308_{1...n}$ and its corresponding sensor (i.e., monitoring electrode) $306_{1...n}$ are approximately (i.e., within a centimeter) the same as shown in FIG. 3.

In one embodiment, each signal acquisition device $308_{1...n}$ accepts from its respective sensor (i.e., monitoring electrode) $306_{1...n}$ respective measurements of a respective environmental parameter(s) outside the housing 304, processes the respective accepted measurements, and transmits the respective processed measurements into the housing 304. In one embodiment, each signal acquisition device $308_{1...n}$ includes a respective acoustic transducer $310_{1...n}$ (similar acoustic transducers (not shown), hereinafter included in reference $310_{1...n}$, are coupled to the signal acquisition devices that are coupled to the sensors (i.e., monitoring electrodes) (not shown) that make measurements for excitation electrodes A'1 ... A'(n−1)(not shown)) through which the respective processed measurements are transmitted.

In one embodiment, the concentrator 312 receives in real time the acoustic signals transmitted by the acoustic transducers $310_{1...n}$ in the signal acquisition devices $308_{1...n}$ through an acoustic transducer 314. In one embodiment, the concentrator 312 receives the acoustic signals, processes them, and transmits the resulting data to the surface through a telemetry link 316.

In one embodiment, the concentrator 312 includes an interface to actuators $318_{1...n}$ through which the concentrator 312 can excite a condition (e.g., an excitation current, an electromagnetic field, or, in other types of tools, an acoustic field) outside the housing 304 that is detectable by the sensors (i.e., monitoring electrodes) $306_{1...n}$. The actuators $318_{1...n}$ stimulate respective excitation electrodes A0 through A(n−1) to create the condition outside the housing 304.

In one embodiment, the concentrator 312 is located at the top end of the housing 304. Using acoustic communications between the signal acquisition devices $308_{1...n}$ and the concentrator 312 reduces or eliminates the need for wiring and a wiring harness for such communications (wiring for power distribution and other purposes may still be necessary), reduces the need to consider such wiring in heat sinking, and reduces the complexity of the mechanical design of the sonde 120, which reduces the cost of mechanical design, the cost of construction, and the cost of maintenance.

Figure 4:
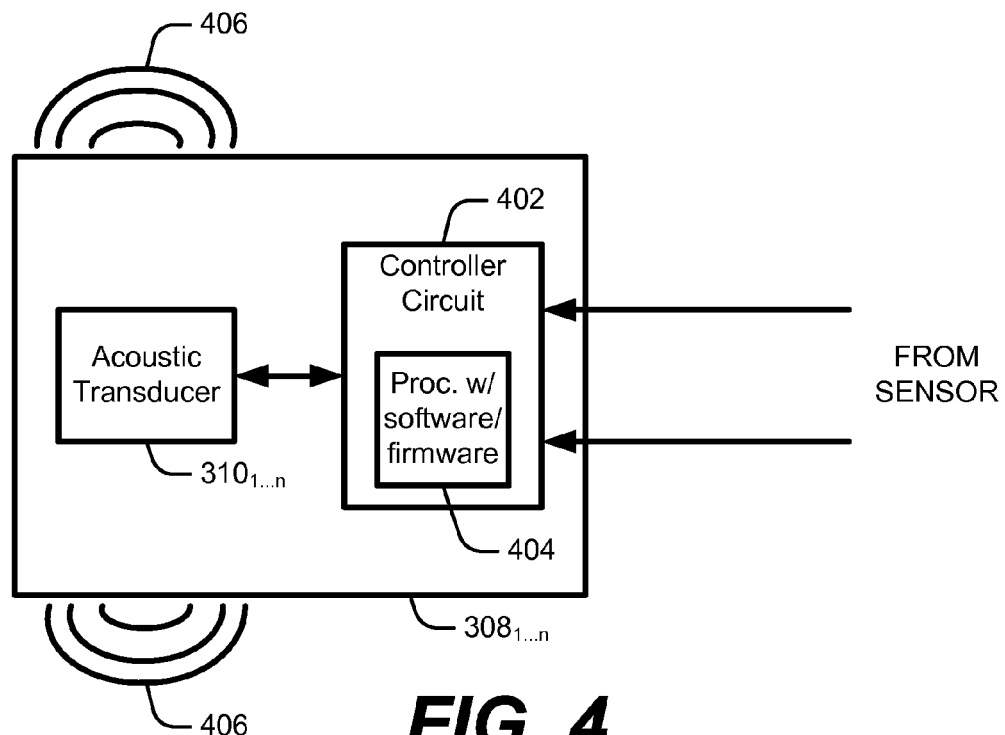
FIG. 4 shows a signal acquisition device.

In one embodiment, illustrated in FIG. 4, each signal acquisition devices $308_{1...n}$ includes a respective acoustic transducer $310_{1...n}$ and a controller circuit 402. In one embodiment, the controller circuit 402 includes the electronics necessary to receive and condition the signals from the respective sensor (i.e., monitoring electrode) $306_{1...n}$. In one embodiment, the controller circuit 402 includes a processor with software or firmware 404 to process the signals from the respective sensor (i.e., monitoring electrodes) $306_{1...n}$ and format it for acoustic transmission (represented by acoustic transmission symbols 406) via respective acoustic transducers $310_{1...n}$. In one embodiment, the controller circuit 402 also receives acoustic signals via respective acoustic transducers $310_{1...n}$. In one embodiment, such acoustic signals include commands (such as "take sample now" or "transmit now", etc.) or revisions or updates to the controller software or firmware 404.

Figure 5:
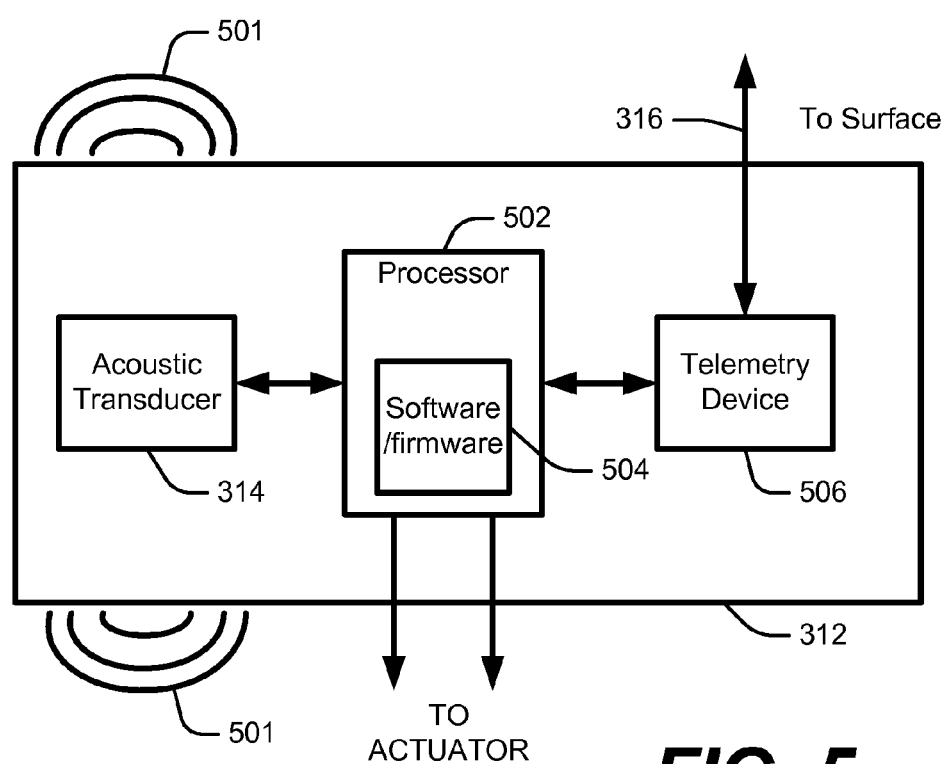
FIG. 5 shows a concentrator.

In one embodiment, illustrated in FIG. 5, the concentrator 312 includes the acoustic transducer 314, through which the concentrator 312 can perform bi-directional acoustic communications (represented by acoustic transmission symbols 501) with the signal acquisition devices $308_{1...n}$. In one embodiment, the concentrator 312 includes a processor 502 with software or firmware 504 to receive and interpret signals from the acoustic transducer 314, process data received from the signal acquisition devices $308_{1...n}$ as required, and provide a data stream to a telemetry device 506 for transmission via the telemetry link 316. In one embodiment, the processor 502 also controls the signal acquisition devices $308_{1...n}$ via acoustic signals transmitted from the acoustic transducer 314. In one embodiment, the processor 502 also controls the actuators $318_{1...n}$.

Figure 6:
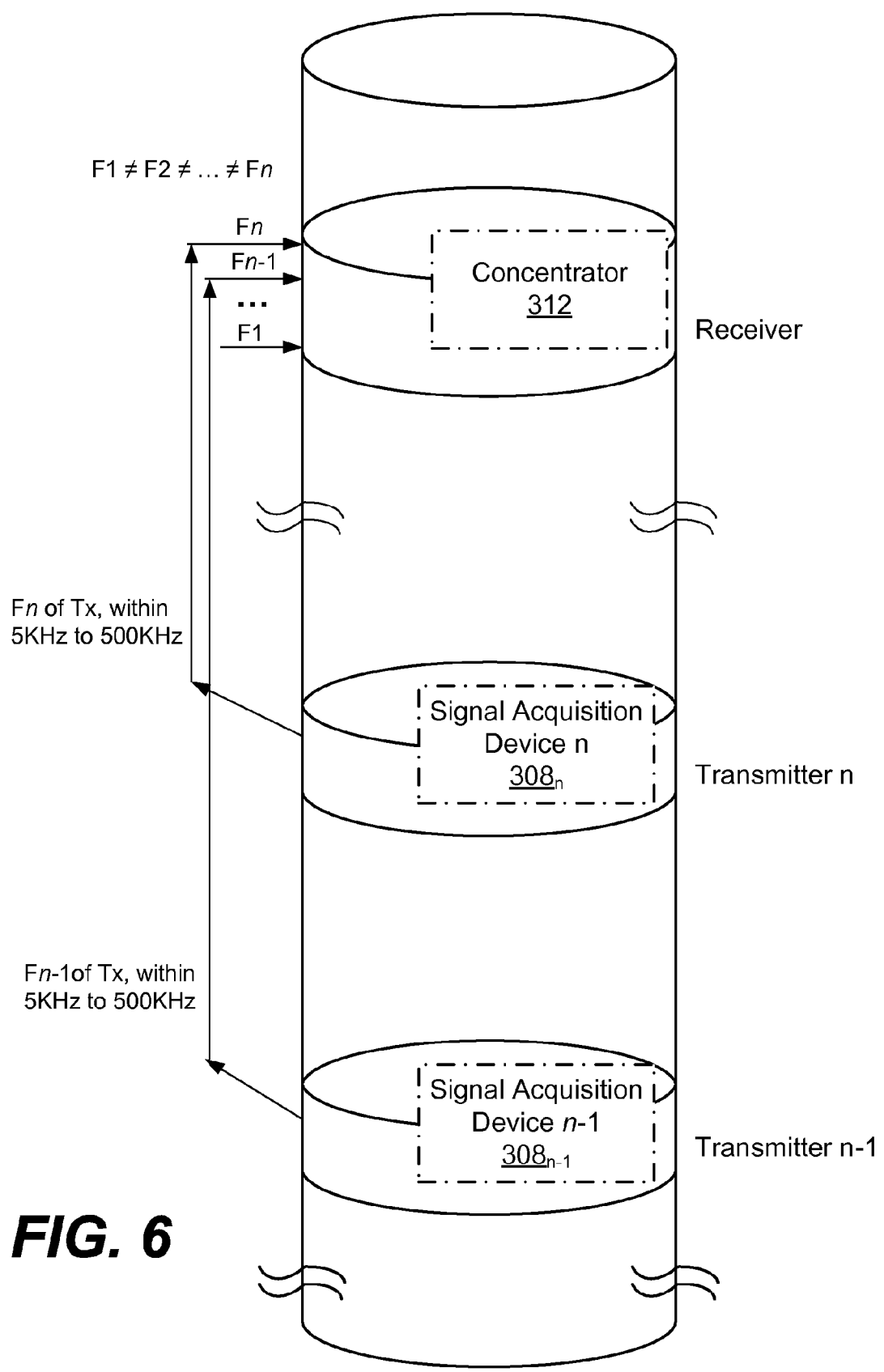
FIG. 6 shows an acoustic communications technique.

In one embodiment for avoiding crosstalk in the communications between the signal acquisition devices $308_{1...n}$ and the concentrator 412, illustrated in FIG. 6, each of the signal acquisition devices $308_{1...n}$ transmits at its own frequency. That is, in one embodiment, each signal acquisition device $308_{1...n}$ transmits at a respective frequency between 5 kilohertz ("kHz") and 500 kHz, which is a frequency range high enough to allow the transmission of the required data in a limited time frame but not too high to cause the acoustic signals to attenuate significantly while propagating in the acoustic medium. In one embodiment, signal acquisition device $308_1$ transmits at frequency F1 (e.g., 10 kHz), signal acquisition device $308_2$ transmits at frequency F2 (e.g., 50 kHz), signal acquisition device $308_3$ transmits at frequency F3 (e.g., 100 kHz), . . . , and signal acquisition device $308_n$ transmits at frequency Fn (e.g. 480 kHz), where F1≠F2≠F3 . . . ≠FN. In one embodiment, the concentrator 312 software or firmware includes a technique to transform the signals received from the signal acquisition devices $308_{1...n}$ into the frequency domain (such as a Fourier transform or a Fast Fourier transform), where the signals from the signal acquisition devices $308_{1...n}$ can be distinguished and processed.

In one embodiment, as described above, the signal acquisition devices $308_{1...n}$ transmit their acoustic signals entirely within the housing 304. In one embodiment, illustrated in FIG. 6, the signal acquisition devices $308_{1...n}$ transmit their signals outside the housing 304 and outside the sonde 120 into the annulus 126, 214 between the sonde 120 and the well bore 112, 212 wall. In one embodiment, in a wireline environment, such as that shown in FIG. 1, the annulus 126 is filled with air or another fluid which provides the medium for the acoustic communications. In one embodiment, in a drilling environment, such as that shown in FIG. 2, the annulus 212 is filled with drilling mud which provides the medium for the acoustic communications.

In one embodiment for avoiding crosstalk in the communications between the signal acquisition devices $308_{1...n}$ and the concentrator 312 using time of flight information, the signal acquisition devices $308_{1...n}$ are time-synchronized by, for example, receiving timing commands from the concentrator 312. For example, in one embodiment, the concentrator 312 transmits an acoustic "reset time" command to the signal acquisition devices $308_{1...n}$. In one embodiment, each signal acquisition device $308_{1...n}$ is programmed with the geometry of the sonde 120 so that it knows the acoustic flight time of the "reset time" command from the concentrator 312. In one embodiment, the signal acquisition devices $308_{1...n}$ reset their respective times relatively simultaneously (i.e., within a millisecond) by delaying their time resets by different times. That is, in one embodiment, signal acquisition device $308_1$ offsets its "reset time" moment by a lesser amount than signal acquisition device $308_2$, which offsets its "reset time" moment by a lesser amount than signal acquisition device $308_3$, and so on.

In one embodiment, each signal acquisition devices $308_{1...n}$ is equipped with devices to measure temperature and pressure of the acoustic transmission medium so that the expected flight time of the "reset time" command and the delay to the "reset time" moment can be adjusted, using a known relationship between velocity, pressure, and temperature, according to current conditions.

In one embodiment, once the time of the signal acquisition devices $308_{1...n}$ is synchronized, as discussed above, the signal acquisition devices $308_{1...n}$ can transmit substantially simultaneously (i.e., within a millisecond of each other) and the concentrator 312 will be able to distinguish the transmissions of the signal acquisition devices $308_{1...n}$ using time of flight. In one embodiment, the concentrator 312 is equipped with devices to measure temperature and pressure of the acoustic transmission medium so that the expected flight times of the acoustic transmissions from the signal acquisition devices $308_{1...n}$ can be adjusted, using a known relationship between velocity, pressure, and temperature, according to current conditions.

In one embodiment, the time-of-flight discriminator technique is combined with the frequency discriminator technique to provide a third technique for reducing crosstalk.

In one embodiment, in any of the crosstalk reduction techniques, the acoustic signals generated by the signal acquisition devices $308_{1...n}$ are carrier frequencies in the range 5 kHz to 500 kHz that are modulated or gated with the digitized data to be transmitted. In one embodiment, the modulation can be amplitude modulation, frequency modulation, frequency shift keying, phase shift keying, or any of the known modulation techniques or combination of those techniques.

Figure 7:
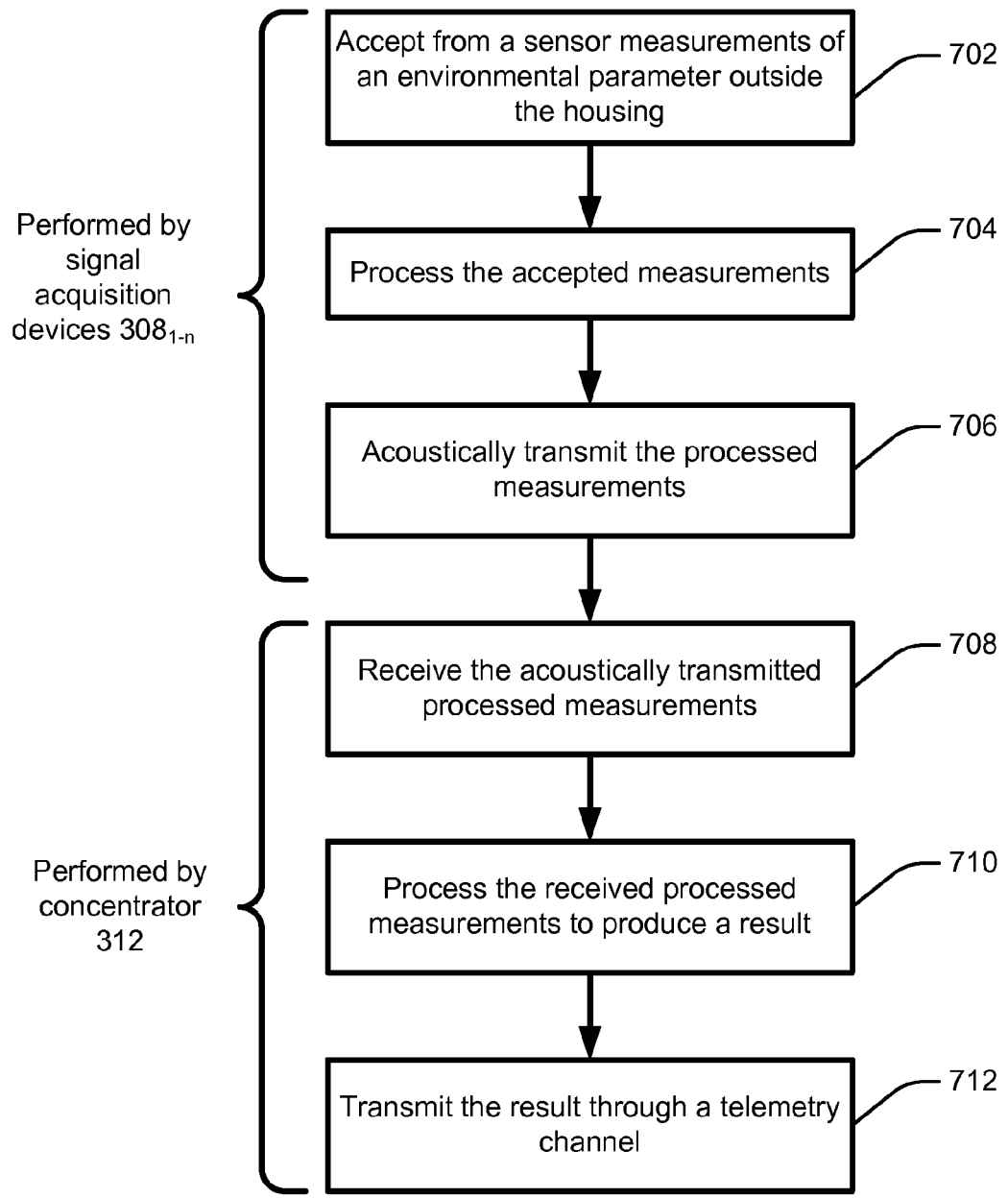
FIG. 7 is a flow chart.

In use, as shown in FIG. 7, a signal acquisition device (i.e., one of the signal acquisition devices $308_{1...n}$) accepts from a sensor (i.e., one of the sensors (i.e., monitoring electrodes) $306_{1...n}$) measurements of an environmental parameter (such as electric voltage, acoustic pressure, temperature, pressure, stress, etc.) outside a housing (such as housing 304) that contains the signal acquisition device (block 702). In one embodiment, the signal acquisition device processes the accepted measurements (block 704) and acoustically transmits the processed measurements (block 706), in one embodiment into the housing (i.e., into the body of the housing, into holes bored into the housing, into a cavity in the housing; alternatively, the acoustic transmission could be into the annulus 214, as described above).

In one embodiment, a concentrator (i.e., concentrator 312) receives the acoustically transmitted processed measurements within the housing (block 708). In one embodiment, the concentrator processes the received processed measurements to produce a result (block 710). In one embodiment, the concentrator transmits the result through a telemetry channel (i.e., telemetry channel 316) (block 712).

Figure 8:
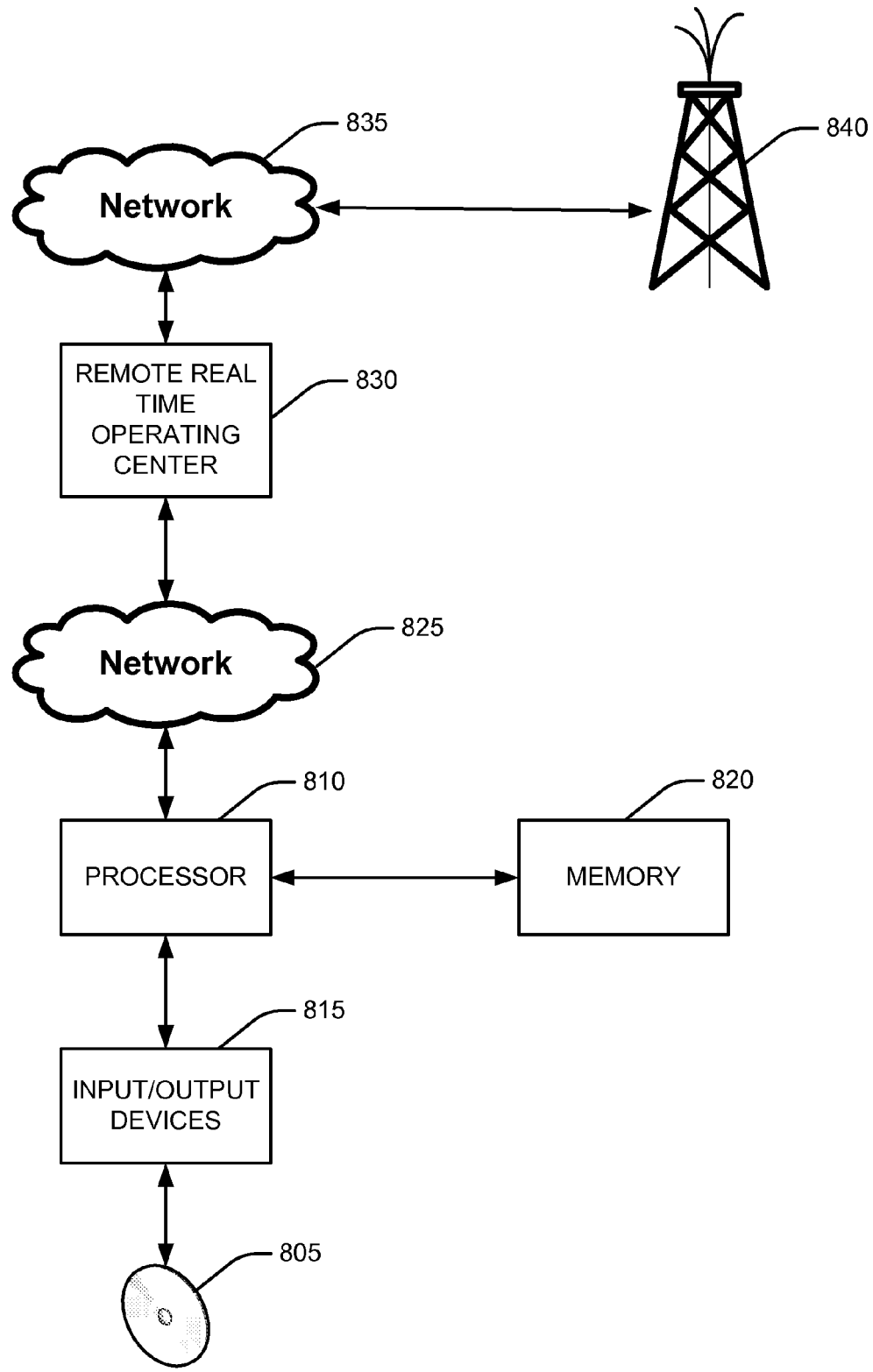
FIG. 8 shows an environment.

In one embodiment, shown in FIG. 8, the sonde 120 is controlled by software in the form of a computer program on a non-transitory computer readable media 805, such as a CD, a DVD, a USB drive, other forms of flash memory, a hard drive, a portable hard drive or other portable memory. In one embodiment, a processor 810, which may be the same as or included in the processor 502 or the controller circuit 402, reads the computer program from the computer readable media 805 through an input/output device 815 and stores it in a memory 820 where it is prepared for execution through compiling and linking, if necessary, and then executed. In one embodiment, the system accepts inputs through an input/output device 815, such as a keyboard or keypad, mouse, touchpad, touch screen, etc., and provides outputs through an input/output device 815, such as a monitor or printer. In one embodiment, the system stores the results of calculations in memory 820 or modifies such calculations that already exist in memory 820.

In one embodiment, the results of calculations that reside in memory 820 are made available through a network 825 to a remote real time operating center 830. In one embodiment, the remote real time operating center 830 makes the results of calculations available through a network 835 to help in the planning of oil wells 840 or in the drilling of oil wells 840, which in one embodiment include drilling operations using the drilling system 200 shown in FIG. 2 or well logging operations using the wireline well logging system 100 illustrated in FIG. 1.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
   a housing;
   the housing containing:
      a chamber having:
      a concentrator, and
      a plurality of signal acquisition devices;
   each signal acquisition device coupled to a respective sensor, each sensor to measure an environmental parameter outside the housing;
   each signal acquisition device comprising:
      an acoustic transducer,
      a controller to:
         accept measurements from the respective sensor,
         process the measurements and format them into a transmittable form, and
         transmit the formatted measurements via the acoustic transducer;
   the concentrator comprising:
      an acoustic transducer to receive acoustic transmissions from the plurality of signal acquisition devices,
      a processor to process the received acoustic transmissions, and
      a telemetry device through which the processor can transmit the processed transmissions.

2. The apparatus of claim 1 wherein the housing comprises a downhole sonde.

3. The apparatus of claim 1 wherein the distance from each signal acquisition device to its respective sensor is less than the distance from any other signal acquisition device contained in the housing to the sensor.

4. The apparatus of claim 1 further comprising:
   an acoustic path from one of the plurality of signal acquisition devices to the concentrator, wherein the acoustic path does not pass through the housing.

5. The apparatus of claim 1 further comprising:
   an acoustic path from one of the plurality of signal acquisition devices to the concentrator, wherein the acoustic path passes through the housing.

6. The apparatus of claim 1 wherein:
   the sensor is selected from the group consisting of an electronic circuit to measure electrical voltage, an acoustic sensor, a temperature sensor, a pressure sensor, and a strain sensor.

7. A method comprising:
   a plurality of signal acquisition devices, each signal acquisition device:
      accepting from a respective sensor respective measurements of a respective environmental parameter outside a housing that contains the signal acquisition device,
      processing the respective accepted measurements,
      acoustically transmitting the respectively processed measurements into the housing;
   a concentrator:
      receiving the acoustically transmitted processed measurements from the plurality of signal acquisition devices within the housing;
      processing the received processed measurements to produce a result; and
      transmitting the result through a telemetry channel;
   wherein the housing comprises a chamber and the chamber contains the concentrator and the plurality of signal acquisition devices.

8. The method of claim 7 wherein:
   each of the plurality of signal acquisition devices acoustically transmitting the respectively processed measurements into the housing on a carrier frequency unique to that signal acquisition device.

9. The method of claim 7 wherein:
   each of the plurality of signal acquisition devices acoustically transmits the respectively processed measurements into the housing at substantially the same moment;
   the concentrator distinguishes the received acoustic transmissions based on the time of flight of each of the received acoustic transmissions.

10. The method of claim 9 further comprising:
    the concentrator adjusting expected flight times from the plurality of signal acquisition devices based on a temperature and a pressure of an acoustic medium through which the acoustically transmitted process measurements traveled.

11. The method of claim 7 wherein:
    the signal acquisition device transmits the processed measurements along an acoustic path to the concentrator, wherein the acoustic path does not pass through the housing.

12. The method of claim 7 wherein:
    the signal acquisition device transmits the processed measurements along an acoustic path to the concentrator, wherein the acoustic path passes through the housing.

13. The method of claim 7 wherein:
    the signal acquisition device transmits the processed measurements at a frequency between 5 kHz and 500 kHz.

14. A computer program stored in a non-transitory computer readable storage medium, the program comprising executable instructions that cause:
    a plurality of signal acquisitions devices to each:
       accept from a respective sensor respective measurements of a respective environmental parameter outside a housing that contains the signal acquisition device,
       process the respective accepted measurements, acoustically transmit the respectively processed measurements into the housing;
a concentrator to:
receive the acoustically transmitted processed measurements from the plurality of signal acquisition devices within the housing;
process the received processed measurements to produce a result; and
transmit the result through a telemetry channel;
wherein the housing comprises a chamber and the chamber contains the concentrator and the plurality of signal acquisition devices.

15. The computer program of claim 14 wherein the program further comprises executable instructions that cause:
each of the plurality of signal acquisition devices to acoustically transmit the respectively processed measurements into the housing on a carrier frequency unique to that signal acquisition device.

16. The computer program of claim 14 wherein the executable instructions cause:
each of the signal acquisition devices to process the respective accepted measurements,
acoustically transmit the respectively processed measurements into the housing at substantially the same moment;
the concentrator to distinguish the received acoustic transmissions based on the time of flight of each of the received acoustic transmissions.

17. The computer program of claim 16 wherein the program further comprises executable instructions that cause:
the concentrator to adjust expected flight times from the plurality of signal acquisition devices based on a temperature and a pressure of an acoustic medium through which the acoustically transmitted process measurements traveled.

18. The computer program of claim 14 wherein the executable instructions cause:
the signal acquisition device to transmit the processed measurements along an acoustic path to the concentrator, wherein the acoustic path does not pass through the housing.

19. The computer program of claim 14 wherein the executable instructions cause:
the signal acquisition device to transmits the processed measurements along an acoustic path to the concentrator, wherein the acoustic path passes through the housing.

20. The computer program of claim 14 wherein the executable instructions cause:
the signal acquisition device to transmit the processed measurements at a frequency between 5 kHz and 500 kHz.

\* \* \* \* \*